United States Patent
Poleti

(10) Patent No.: US 11,118,631 B2
(45) Date of Patent: Sep. 14, 2021

(54) PROPSHAFT WITH VENTED SLINGER

(71) Applicant: AMERICAN AXLE & MANUFACTURING, INC., Detroit, MI (US)

(72) Inventor: Guilherme Targa Poleti, Curitiba (BR)

(73) Assignee: American Axle & Manufacturing, Inc., Detroit, MI (US)

(*) Notice: Subject to any disclaimer, the term of this patent is extended or adjusted under 35 U.S.C. 154(b) by 273 days.

(21) Appl. No.: 16/507,454

(22) Filed: Jul. 10, 2019

(65) Prior Publication Data

US 2021/0010542 A1 Jan. 14, 2021

(51) Int. Cl.
| | |
|---|---|
| *F16D 3/06* | (2006.01) |
| *F16D 3/84* | (2006.01) |
| *F16D 3/18* | (2006.01) |
| *F16D 3/40* | (2006.01) |
| *F16C 3/03* | (2006.01) |

(52) U.S. Cl.
CPC .............. *F16D 3/06* (2013.01); *F16C 3/03* (2013.01); *F16D 3/185* (2013.01); *F16D 3/40* (2013.01); *F16D 3/845* (2013.01); *F16D 2003/846* (2013.01); *Y10S 277/928* (2013.01)

(58) Field of Classification Search
CPC . F16D 3/06; F16D 3/845; F16D 3/185; F16D 3/40; F16D 2003/846; F16D 3/41; F16C 3/03; F16C 33/80; F16C 2326/06; F16C 19/06; F16C 27/066; Y10S 277/928; B60K 17/22; B60K 17/24

USPC ............................................ 464/17; 384/476
See application file for complete search history.

(56) References Cited

U.S. PATENT DOCUMENTS

| | | | |
|---|---|---|---|
| 6,913,105 B2 * | 7/2005 | Masuda ................. | B60K 17/24 464/167 |
| 7,338,384 B2 | 3/2008 | Patrascu et al. | |
| 7,819,588 B2 * | 10/2010 | Nagayama ............ | F16C 33/805 464/178 |
| 8,083,595 B2 | 12/2011 | Sanchez et al. | |
| 8,690,690 B2 | 4/2014 | Conger et al. | |
| 9,890,808 B2 | 2/2018 | Wang | |
| 2009/0215543 A1 | 8/2009 | Brissette | |
| 2020/0370603 A1 * | 11/2020 | Mabe ....................... | F16D 3/06 |

* cited by examiner

*Primary Examiner* — Greg Binda
(74) *Attorney, Agent, or Firm* — Burris Law, PLLC

(57) ABSTRACT

A propshaft with first and second propshaft segments, a bearing assembly, a slinger and a boot seal. The first and second propshaft segments have connection members that are non-rotatably but axially slidably coupled together. The bearing assembly is mounted to the first propshaft segment and supports the first propshaft segment for rotation. The slinger has a first slinger member, which is mounted to the bearing assembly, and a second slinger member that is mounted to the first propshaft segment. The first and second slinger members cooperate to shroud an axial end of the bearing assembly and are spaced apart from one another to form a labyrinth. Opposite ends of the boot seal are fixedly coupled to the second slinger member and the second propshaft segment. A vent is disposed through the second slinger member to fluidly couple the boot seal and the labyrinth.

8 Claims, 2 Drawing Sheets

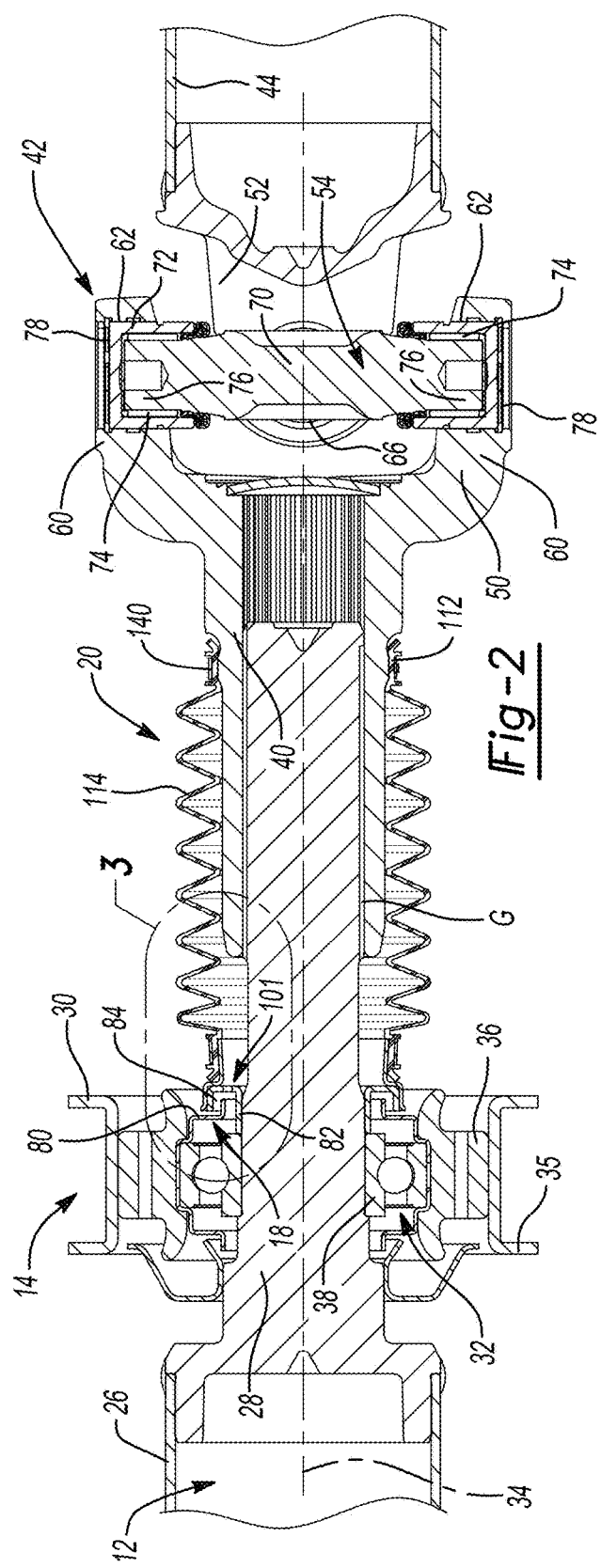
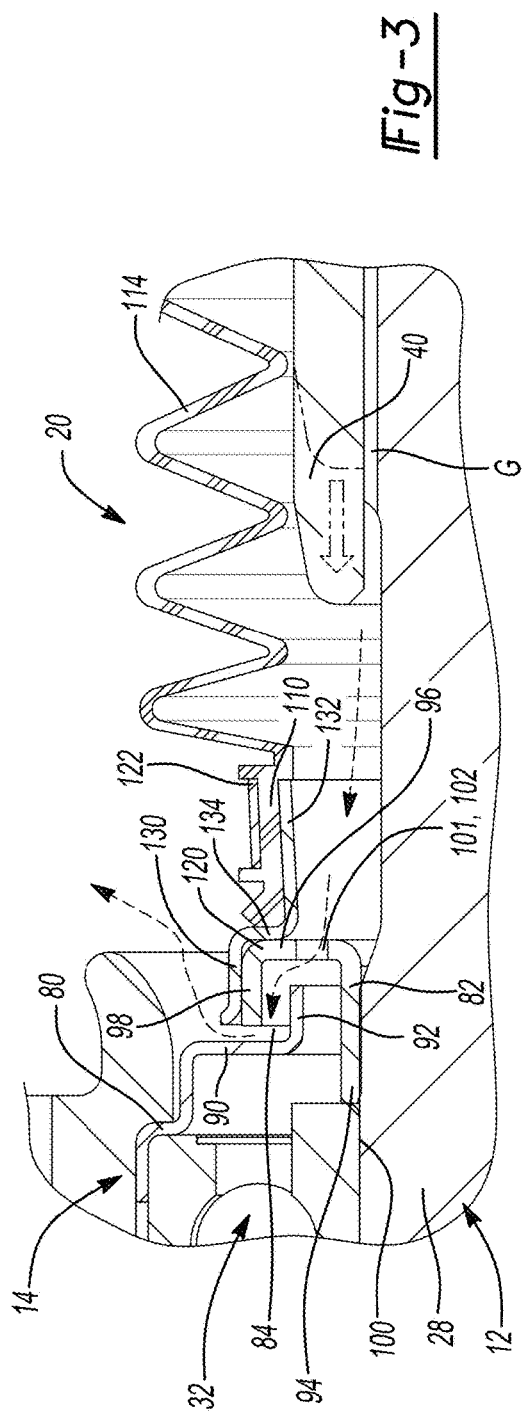

PROPSHAFT WITH VENTED SLINGER

FIELD

The present disclosure relates to a propshaft with a vented slinger.

BACKGROUND

This section provides background information related to the present disclosure which is not necessarily prior art.

It is relatively common practice in the construction of a relatively long vehicle, such as a delivery truck, to employ a multi-segment propshaft between an output shaft of a transmission and an input pinion of a rear or front axle to transmit rotary power and torque. Such propshafts typically have one or more sections that are mounted to the body of the vehicle in a manner that does not permit translation of the segment(s) along the longitudinal/rotational axis of the propshaft, and a final section that is configured to telescope inward and outward along the longitudinal/rotational axis of the propshaft when the rear axle moves vertically relative to the body of the vehicle (e.g., due to the load carried by the vehicle and/or as a result of traveling over irregularities on the surface on which the vehicle is operating).

To guard against the infiltration of moisture, dust and debris into the telescoping joint of the propshaft, a boot seal is commonly employed. One axial end of the boot seal is mounted to a portion of a segment of the propshaft that translates along the longitudinal/rotational axis of the propshaft relative to the body, while the opposite axial end of the boot seal is mounted to a component of the propshaft that is maintained in a stationary position along the longitudinal/rotational axis of the propshaft relative to the body of the vehicle. An accordion-like bellows or pleated segment between the two axial end permits relatively axial movement between the two axial ends of the boot seal.

One disadvantage of a boot seal is that it does not permit the free exhausting of air from the telescoping joint when the joint is compressed to install the propshaft to a vehicle. Consequently, a relatively large axial force is frequently needed to telescope one segment of the propshaft into another segment of the propshaft so that the propshaft can be installed to a vehicle.

SUMMARY

This section provides a general summary of the disclosure, and is not a comprehensive disclosure of its full scope or all of its features.

In one form, the present disclosure provides a propshaft that includes a first propshaft segment, a bearing assembly, a second propshaft segment, a slinger and a boot seal. The first propshaft segment has a first connection member. The bearing assembly is mounted to the first propshaft segment and has a rolling element bearing that supports the first propshaft segment for rotation about an axis. The second propshaft segment has a second connection member that is non-rotatably but axially slidably coupled to the first connection member. The slinger having a first slinger member, which is mounted to the bearing assembly, and a second slinger member that is mounted to the first propshaft segment. The first and second slinger members cooperate to shroud an axial end of the rolling element bearing. The boot seal is disposed about the first and second connection members and has a first end, which is fixedly coupled to the second slinger member, a second end, which is fixedly coupled to the second propshaft segment, and a bellows section disposed axially between the first and second ends. The first and second slinger members are spaced apart from one another to form a labyrinth there between. A vent is disposed through the second slinger member to fluidly couple the boot seal and the labyrinth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a longitudinal section view of a portion of the propshaft of FIG. 1 illustrating the configuration of a telescoping joint; and FIG. 3 is an enlarged portion of FIG. 2.

Corresponding reference numerals indicate corresponding parts throughout the several views of the drawings.

DETAILED DESCRIPTION

Figure 1:
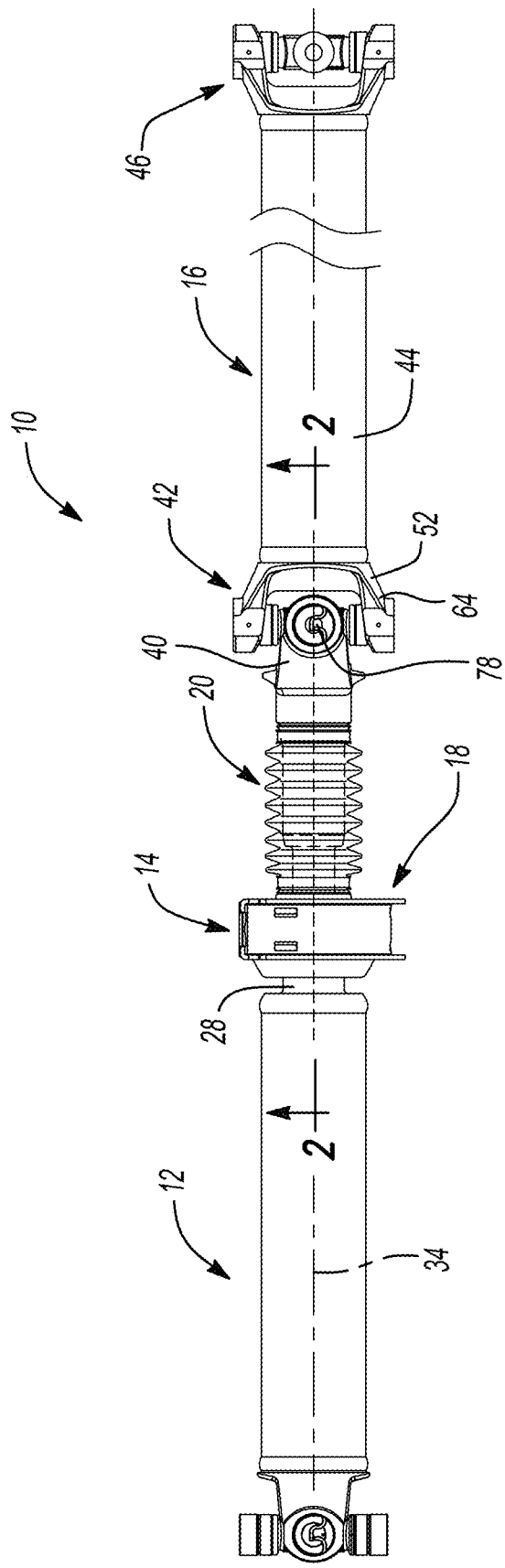
FIG. 1 is a side elevation view of a propshaft constructed in accordance with the teachings of the present disclosure.

With reference to FIGS. 1 and 2, a propshaft constructed in accordance with the teachings of the present disclosure is generally indicated by reference numeral 10. The propshaft 10 can have a first propshaft segment 12, a bearing assembly 14, a second propshaft segment 16, a slinger 18 and a boot seal 20.

The first propshaft segment 12 has a first tube 26 and a first connection member 28 that is fixedly coupled to the first tube 26 in any desired manner, such as welding.

The bearing assembly 14 can include a bearing mount 30, which is configured to be fixedly coupled to a frame (not shown) of a motor vehicle (not shown), and a rolling element bearing 32 that is fixedly coupled to the bearing mount 30 and configured to support the first propshaft segment 12 for rotation about a rotational axis 34. The bearing mount 30 can include an annular cage 35 and a resilient mount member 36 that can be received within the cage 35. The resilient mount member 36 can couple the rolling element bearing 32 to the cage 35 in a manner that attenuates the transmission of vibration between the rolling element bearing 32 and the cage 35. The rolling element bearing 32 can having an inner bearing race 38 that can be mounted to the first propshaft segment 12. In the example provided the inner bearing race 38 of the rolling element bearing 32 is mounted directly to the first connection member 28.

The second propshaft segment 16 has a second connection member 40, a first universal joint 42, a second tube 44 and a second universal joint 46, which is only partly shown. The second connection member 40 is non-rotatably but axially slidably coupled to the first connection member 28. In the example provided, the first connection member 28 is an externally splined shaft and the second connection member 40 defines an internally splined aperture into which the externally splined shaft of the first connection member 28 is received. It will be appreciated, however, that the second connection member 40 could be an externally splined shaft and that the first connection member 28 could define an internally splined aperture into which the externally splined shaft of the second connection member 40 could be matingly received. If desired, a suitable lubricant, a coating and/or a plating can be disposed on one or both of the first and second connection members 28 and 40 to reduce friction therebetween. In the example provided, a grease G is disposed between the first and second connection members 28 and 40.

The first universal joint 42 can be any type of universal joint, such as a constant velocity joint. In the particular example provided, the first universal joint 42 is a Cardan joint having a first yoke 50, a second yoke 52 and a universal joint bearing 54. The first yoke 50, which is fixedly coupled to (e.g., integrally and unitarily formed with) the second connection member 40 to form a "slip yoke", includes a pair of first arms 60 having bearing apertures 62 formed therethrough at an orientation that is perpendicular to the rotational axis 34. The second yoke 52 is fixedly coupled to a first axial end of the second tube 44 and defines a pair of second arms 64, each of which having a bearing aperture 66 formed therethrough at an orientation that is also perpendicular to the rotational axis 34. The universal joint bearing 54 can include a cross-trunnion 70, a plurality of bearing cups 72 and a plurality of sets of needle rollers 74. The cross-trunnion 70 can define two pair of trunnions 76 (only one pair is specifically shown), with one pair of trunnions 76 being disposed ninety degrees from the other pair of trunnions 76. Each of the bearing cups 72 can be received in one of the bearing apertures 62 and 66 and over an associated one of the trunnions 76. Each set of needle rollers 74 can be received in an associated one of the bearing cups 72 and can be engaged to the inside surface of the associated one of the bearing cups 72 and an exterior circumferential surface of an associated one of the trunnions 76. Retainers, such as internal snap rings 78, can be employed to inhibit the withdrawal of the bearing cups 72 in a direction away from their respective trunnions 76.

Like the first universal joint 42, the second universal joint 46 can be any type of universal joint but is depicted as being a Cardan joint in the example provided. The second universal joint 46 can be constructed in a manner that is similar to that of the first universal joint 42 and as such, a detailed discussion of the second universal joint 46 need not be provided herein. The second yoke of the second universal joint 46 is not shown, but it will be appreciated that it could be fixedly couple to (e.g., unitarily and integrally formed with) a yoke flange that is permits the second yoke of the second universal joint 46 to be fixedly coupled to an input pinion (not shown) of a rear axle (not shown).

With reference to FIGS. 2 and 3, the slinger 18 can have a first slinger member 80, which is mounted to the bearing assembly 14, and a second slinger member 82 that is mounted to the first propshaft segment 12. The first and second slinger members 80 and 82 cooperate to shroud an axial end of the rolling element bearing 32 and are spaced axially apart from one another and form a labyrinth 84 therebetween. In the example provided, the first slinger member 80 is a discrete component that is mounted to the bearing mount 30 so as to abut an axial end of the rolling element bearing 32. The first slinger member 80 can include an annular segment 90 and a tubular segment 92. The annular segment 90 can extend radially inwardly from the bearing mount 30. The tubular segment 92 can be fixedly coupled to the radially inward end of the annular segment 90 and can extend concentrically about the rotational axis 34 in a direction away from the rolling element bearing 32.

The second slinger member 82 can include a first tubular segment 94, an annular segment 96 and a second tubular segment 98. The first tubular segment 94 can be configured to be mounted in a press-fit manner onto a cylindrical surface 100 formed on the first connection member 28. The first tubular segment 94 can be disposed concentrically within the tubular segment 92 on the first slinger member 80. The annular segment 96 can be fixedly coupled to an axial end of the first tubular segment 94 and can extend radially outwardly therefrom at a location that is spaced apart from the tubular segment 92 on the first slinger member 80. The second tubular segment 98 can be disposed coaxially with the first tubular segment 94, can be fixedly coupled to an end of the annular segment 96 opposite the first tubular segment 94, and can extend axially from the annular segment 96 toward the annular segment 90 formed on the first slinger member 80. The labyrinth 84 that is disposed axially between the first and second slinger members 80 and 82 fluidly connects the rolling element bearing 32 to the atmosphere.

A vent 101 is disposed through the second slinger member 82 to fluidly couple the boot seal 20 and the labyrinth 84. More specifically, the vent 101 can comprise one or more vent apertures 102 that can be formed through a desired portion of the second slinger member 82, such as through the annular segment 96. The one or more vent apertures 102 can be shaped in any desired manner, such as round holes or as circumferentially extending slots, for example. In the particular example provided, the vent 101 includes a single, circular vent aperture 102 having a diameter that is about equal to 1.5 times the thickness of the annular segment 96.

The boot seal 20 can be disposed about the first and second connection members 28 and 40 and can have first and second ends 110 and 112, respectively, and a bellows section 114 that can be disposed axially between the first and second ends 110 and 112. The first end 110 of the boot seal 20 can be fixedly coupled to the second slinger member 82, while the second end 112 of the boot seal 20 can be fixedly coupled to the second connection member 40.

In the example provided, an annular band 120 is mounted to the second tubular segment 98 of the second slinger member 82 and a band clamp 122 applies a clamping force to the first end 110 of the boot seal 20 that secures the first end 110 to the annular band 120 in a manner that seals the first end 110 to the annular band 120. The annular band 120 can be formed like a reducing bushing and can include a first tubular portion 130, which is fixedly and sealingly engaged to the second tubular segment 98 of the second slinger member 82, a second tubular portion 132, which is reduced in diameter relative to the first tubular portion 130 and which extends axially away from the first tubular portion 130, and a transition section 134 that necks down or transitions between the first tubular portion 130 and the second tubular portion 132. The second tubular portion 132 is coaxial with but spaced axially apart from the first tubular portion 130.

The first end 110 of the boot seal 20 can be shaped to match a desired portion of the configuration of the annular band 120 and the band clamp 122 can be mounted on a portion of the first end 110 that is engaged to the second tubular portion 132. It will be appreciated that the annular band 120 is merely a convenient means for fixedly and sealingly securing the first end 110 of the boot seal 20 to the second slinger member 82 in the example provided, and that the first end 110 of the boot seal 20 could be coupled to the second slinger member 82 in various other ways.

The second end 112 of the boot seal 20 can be engaged directly to the second connection member 40 and a band clamp 140 can be employed to fixedly and sealingly couple the second end 112 to the second connection member 40.

Absent the vent 101 in the second slinger member 82, air trapped between the first and second connection members 28 and 40, the second slinger member 82 and the interior of the boot seal 20 would tend to resist the telescoping of the first connection member 28 into the second connection member 40 and/or would tend to urge the second connection member 40 away from the first connection member 28 after the first connection member 28 has telescoped into the second connection member 40. The provision of the vent 101, however, fluidly couples the interior of the boot seal 20 to the labyrinth 84 so that the air in the boot seal 20 that would otherwise be compressed when the first connection member 28 telescoped into the second connection member 40 can be vented through the second slinger member 82 and the labyrinth 84 to the atmosphere. Accordingly, the force required to collapse the propshaft 10 (i.e., telescope the first connection member 28 into the second connection member 40) for assembly of the propshaft 10 to a vehicle, as well as to eliminate the compressed air in the boot seal 20 that would tend to cause the propshaft 10 to extend (i.e., by urging the second connection member 40 away from the first connection member 28).

In the example provided, the grease that is disposed between the first and second connection members 28 and 40 inhibits any dirt or moisture that enters the boot seal 20 through the vent 101 from migrating between the first and second connection members 28 and 40.

It will be appreciated that while the propshaft 10 has been illustrated and described as including to propshaft segments and two universal joints, the propshaft could be constructed somewhat differently to include more than two propshaft segments and optionally more than two universal joints. Moreover, the slip joint provided by the first and second connection members 28 and 40, the vent 101, the slinger 18 and the boot seal 20 can be moved to a different location, or alternatively, a second, similarly constructed slip joint (with a slinger, which defines a labyrinth, and a vent) can be integrated into the propshaft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propshaft comprising:
   a first propshaft segment having a first connection member;
   a bearing assembly mounted to the first propshaft segment, the bearing assembly having a rolling element bearing that supports the first propshaft segment for rotation about an axis;
   a second propshaft segment having a second connection member that is non-rotatably but axially slidably coupled to the first connection member;
   a slinger having a first slinger member, which is mounted to the bearing assembly, and a second slinger member that is mounted to the first propshaft segment, the first and second slinger members cooperating to shroud an axial end of the rolling element bearing; and
   a boot seal disposed about the first and second connection members, the boot seal having a first end, which is fixedly coupled to the second slinger member, a second end, which is fixedly coupled to the second propshaft segment, and a bellows section disposed axially between the first and second ends;
   wherein the first and second slinger members are spaced apart from one another to form a labyrinth there between, and wherein a vent is disposed through the second slinger member to fluidly couple the boot seal and the labyrinth.

2. The propshaft of claim 1, wherein the first connection member comprises an externally splined shaft and wherein the second connection member comprises an internally splined aperture into which the externally splined shaft is received.

3. The propshaft of claim 2, wherein the second connection member is fixedly coupled to a first yoke, and wherein the second propshaft segment further comprises tube, a second yoke that is fixedly coupled to the tube, and a universal joint bearing assembly that is disposed between the first and second yokes.

4. The propshaft of claim 1, wherein the vent comprises a single aperture formed through the second slinger member.

5. The propshaft of claim 1, further comprising an annular band that is coupled to the second slinger member, wherein the first end of the boot seal is mounted onto and sealingly engaged with the annular band.

6. The propshaft of claim 5, wherein the annular band has a first tubular section, which is fitted onto and sealingly engaged with the second slinger member, and a second tubular section that is coaxial with but spaced axially apart from the first tubular section.

7. The propshaft of claim 6, wherein a band clamp secures the first end of the boot seal to the second tubular section.

8. The propshaft of claim 1, further comprising grease disposed between the first and second connection members.

* * * * *